United States Patent
Large et al.

(10) Patent No.: US 10,955,943 B1
(45) Date of Patent: Mar. 23, 2021

(54) TOUCH SCREEN PANEL WITH SURFACE FRICTION MODIFICATION

(71) Applicant: Microsoft Technology Licensing, LLC, Redmond, WA (US)

(72) Inventors: Timothy Andrew Large, Bellevue, WA (US); Siyuan Ma, Bothell, WA (US); Neil Emerton, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/820,341

(22) Filed: Mar. 16, 2020

Related U.S. Application Data (60) Provisional application No. 62/983,084, filed on Feb. 28, 2020.

(51) Int. Cl.
*G06F 3/0354* (2013.01)
*G06F 3/041* (2006.01)
(Continued)

(52) U.S. Cl.
CPC ...... *G06F 3/03545* (2013.01); *G02F 1/13338* (2013.01); *G02F 1/133308* (2013.01);
(Continued)

(58) Field of Classification Search
CPC .... G06F 3/03545; G06F 3/0412; G06F 3/044; G02F 1/133308; G02F 1/13338; G02F 2001/13331
See application file for complete search history.

(56) References Cited

U.S. PATENT DOCUMENTS

| | | | | |
|---|---|---|---|---|
| 4,793,354 A | * | 12/1988 | Wright | A61B 10/00 434/113 |
| 7,602,398 B2 | | 10/2009 | Zhou et al. | |

(Continued)

FOREIGN PATENT DOCUMENTS

| | | |
|---|---|---|
| EP | 0156246 A1 | 10/1985 |
| EP | 2375306 B1 | 7/2014 |

(Continued)

OTHER PUBLICATIONS

Kildal, Johan, "Evoked Friction on a Smooth Touch Device", In Proceedings of Extended Abstracts on Human Factors in Computing Systems, May 7, 2011, pp. 2233-2238.

(Continued)

*Primary Examiner* — Stacy Khoo
(74) *Attorney, Agent, or Firm* — Fiala & Weaver P.L.L.C.

(57) ABSTRACT

Embodiments enable forming a friction modified touch sensitive surface on a touch screen panel. In particular, the touch sensitive surface is augmented with two friction modifying materials that are interspersed with one another according to a predetermined pattern on the surface of the touch screen panel as a monomolecular layer. In an embodiment, The materials have indices of refraction that differ from each other by more than 0.10. In another embodiment, the materials have a kinetic coefficient of friction in one or the other range, respectively, of between 0.01 and 0.05, or between 0.06 and 0.1, said kinetic coefficients of friction being measured against printing paper that has a kinetic coefficient of friction of 0.17 with itself. In another embodiment, the materials have a water contact angle of greater than 90 degrees, and an oil contact angle of greater than 30 degrees as measured with n-hexadecane.

20 Claims, 8 Drawing Sheets

(51) Int. Cl.
*G02F 1/1333* (2006.01)
*G06F 3/044* (2006.01)

(52) U.S. Cl.
CPC .......... *G06F 3/044* (2013.01); *G06F 3/0412* (2013.01); *G02F 2001/133331* (2013.01)

(56) References Cited

U.S. PATENT DOCUMENTS

| | | |
|---|---|---|
| 8,431,216 B2 | 4/2013 | Kim et al. |
| 8,842,076 B2 | 9/2014 | Doray et al. |
| 9,588,263 B2 | 3/2017 | Gollier et al. |
| 9,696,803 B2 | 7/2017 | Cruz-Hernandez et al. |
| 2005/0230261 A1 | 10/2005 | Cohen et al. |
| 2009/0041984 A1 | 2/2009 | Mayers et al. |
| 2010/0001971 A1 | 1/2010 | Jiang et al. |
| 2011/0217638 A1 | 9/2011 | Kim et al. |
| 2011/0250435 A1 | 10/2011 | Ge et al. |
| 2012/0088067 A1 | 4/2012 | Rappoport et al. |
| 2012/0327006 A1 | 12/2012 | Israr et al. |
| 2013/0002555 A1 | 1/2013 | Lee |
| 2014/0065366 A1 | 3/2014 | Joubaud |
| 2014/0098306 A1 | 4/2014 | King et al. |
| 2015/0016038 A1 | 1/2015 | Niu et al. |
| 2016/0172237 A1 | 6/2016 | Bristol et al. |
| 2017/0139500 A1 | 5/2017 | Large et al. |
| 2018/0088770 A1* | 3/2018 | Brombach ............ G06F 3/0482 |

FOREIGN PATENT DOCUMENTS

| | | |
|---|---|---|
| EP | 3273327 A1 | 1/2018 |
| JP | 08030369 A | 2/1996 |
| JP | 08249103 A | 9/1996 |
| JP | 2001243016 A | 9/2001 |
| JP | 4640535 B1 | 3/2011 |
| WO | 2004044655 A1 | 5/2004 |
| WO | 2006030721 A1 | 3/2006 |
| WO | 2008150611 A2 | 12/2008 |
| WO | 2010118108 A2 | 10/2010 |
| WO | 2011048647 A1 | 4/2011 |
| WO | 2014076599 A1 | 5/2014 |

OTHER PUBLICATIONS

"3M™ Novec™ 1720 Electronic Grade Coating", Retrieved from: https://multimedia.3m.com/mws/media/234297O/3m-novec-1720-electronic-grade-coating.pdf, 2014, 02 Pages.

"Fatty Touch Screens", Retrieved from: http://inotes4you.com/2014/11/11/fatty-touch-screens/, Retrieved Date: Aug. 26, 2015, 07 Pages.

"TeslaTouch: Electrovibration for Touch Surfaces", Retrieved from: http://www.olivierbau.com/teslatouch.php, Retrieved Date: Aug. 26, 2015, 08 Pages.

"Final Office Action Issued in U.S. Appl. No. 14/942,760", dated Feb. 15, 2018, 12 Pages.

"Final Office Action Issued in U.S. Appl. No. 14/942,760", dated May 15, 2017, 17 Pages.

"Non Final Office Action Issued in U.S. Appl. No. 14/942,760", dated Jan. 25, 2017, 14 Pages.

"Non Final Office Action Issued in U.S. Appl. No. 14/942,760", dated Sep. 21, 2017, 16 Pages.

Brooks, et al., "Plasma Polymerization: A Versatile and Attractive Process for Conformal Coating", In Proceedings of SMTA International, Oct. 14, 2012, 06 Pages.

Darling, et al., "Tangible display systems: direct interfaces for computer-based studies of surface appearance", In Journal of Human Vision and Electronic Imaging XV, vol. 7527, Feb. 18, 2010, 12 Pages.

Jabbour, et al., "Screen Printing for the Fabrication of Organic Light-Emitting Devices", In IEEE Journal of Selected Topics in Quantum Electronics, vol. 7, Issue 5, Sep. 2001, pp. 769-773.

"International Search Report and Written Opinion Issued in PCT Application No. PCT/US2016/061015", dated Feb. 3, 2017, 10 Pages.

"Second Written Opinion Issued in PCT Application No. PCT/US2016/061015", dated Oct. 2, 2017, 7 Pages.

Pedder, et al., "Pulsed Laser Processing of Shallow Micro-Optical Structures", In Proceedings of Photon Processing in Microelectronics and Photonics VI, vol. 6458, Mar. 13, 2007, 07 Pages.

* cited by examiner

White Noise 504

FIG. 5a

Radial Power Spectra 506

FIG. 5b

Blue Noise Tile 602

FIG. 6a

Blue Noise from 3x3 Tiling 604

FIG. 6b

Radial Power Spectra 606

TOUCH SCREEN PANEL WITH SURFACE FRICTION MODIFICATION

CROSS-REFERENCE TO RELATED APPLICATIONS

This application claims priority to U.S. Provisional Patent Application No. 62/983,084, filed Feb. 28, 2020, the entirety of which is incorporated by reference herein.

BACKGROUND

Keyboard and mouse input devices have, until relatively recently, been the most common input devices used with computing devices such as PCs. Even touch screen smart phones generally accept text input via a virtual keyboard rendered on the touch screen. More recently, however, pen-based input to touch screen devices has become more popular.

The high-resolution, wide color gamut displays common to some touch screen devices (e.g., Microsoft® Surface® Tablet computers) enable sophisticated digital drawing applications that provide accurate simulation of artistic drawing and painting (i.e., simulation of strokes of pens, pencils, brushes, and the like), particularly when used with a stylus or digital pen.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Touch screen panels, touch screen computing devices and methods of forming a friction modified touch sensitive surface on a touch screen are described herein. In an example aspect, the outer, touch sensitive surface of a touch screen panel is augmented with friction modifying materials. In embodiments, first and second friction modifying materials are interspersed with one another according to a predetermined pattern on the surface of the touch screen panel as a monomolecular layer.

In a further aspect, first and second friction modifying materials are chosen such that one of the friction modifying materials is relatively more amorphous than the other. In an embodiment, first and second friction modifying materials are chosen to have substantially different indices of refraction, wherein the difference is greater than 0.10. In another embodiment, the first and second friction modifying materials are chosen to have a kinetic coefficient of friction in one or the other range, respectively, of between 0.01 and 0.05, or between 0.06 and 0.1, said kinetic coefficients of friction being measured against printing paper that has a kinetic coefficient of friction of 0.17 with itself. In another embodiment, first and second friction modifying materials are chosen to have a water contact angle of greater than 90 degrees, and an oil contact angle of greater than 30 degrees as measured with n-hexadecane.

In another aspect, first and second friction modifying materials are interspersed with one another according to a predetermined pattern comprising: a Penrose tiling pattern; a white noise pattern; a blue noise pattern; or a plurality of sub-patterns, each sub-pattern being adjacent to at least one other sub-pattern wherein transitions between adjacent sub-patterns are substantially undetectable.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As described above, modern high-resolution, wide color gamut displays enable applications on touch screen devices to accurately simulate strokes of pens and/or pencils. Although such simulated strokes may visually be very realistic, unfortunately the physical sensations associated with using a digital pen or stylus to draw such strokes on a touch screen device do not compare favorably with traditional pencil and paper.

The feel of a pencil or pen writing on paper is distinctive and sliding a rigid stylus tip across the perfectly smooth glass of a touch screen panel completely fails to replicate that feel. Touch screen panels with smooth touch surfaces may make it difficult to create or control fine strokes with the stylus since the glass surface of typical touch screen panels have so little friction. Moreover, the lack of friction between the stylus tip and touch screen surface can make it difficult for users to maintain awareness of the location of the stylus tip without actively looking at the pen.

Figure 1:
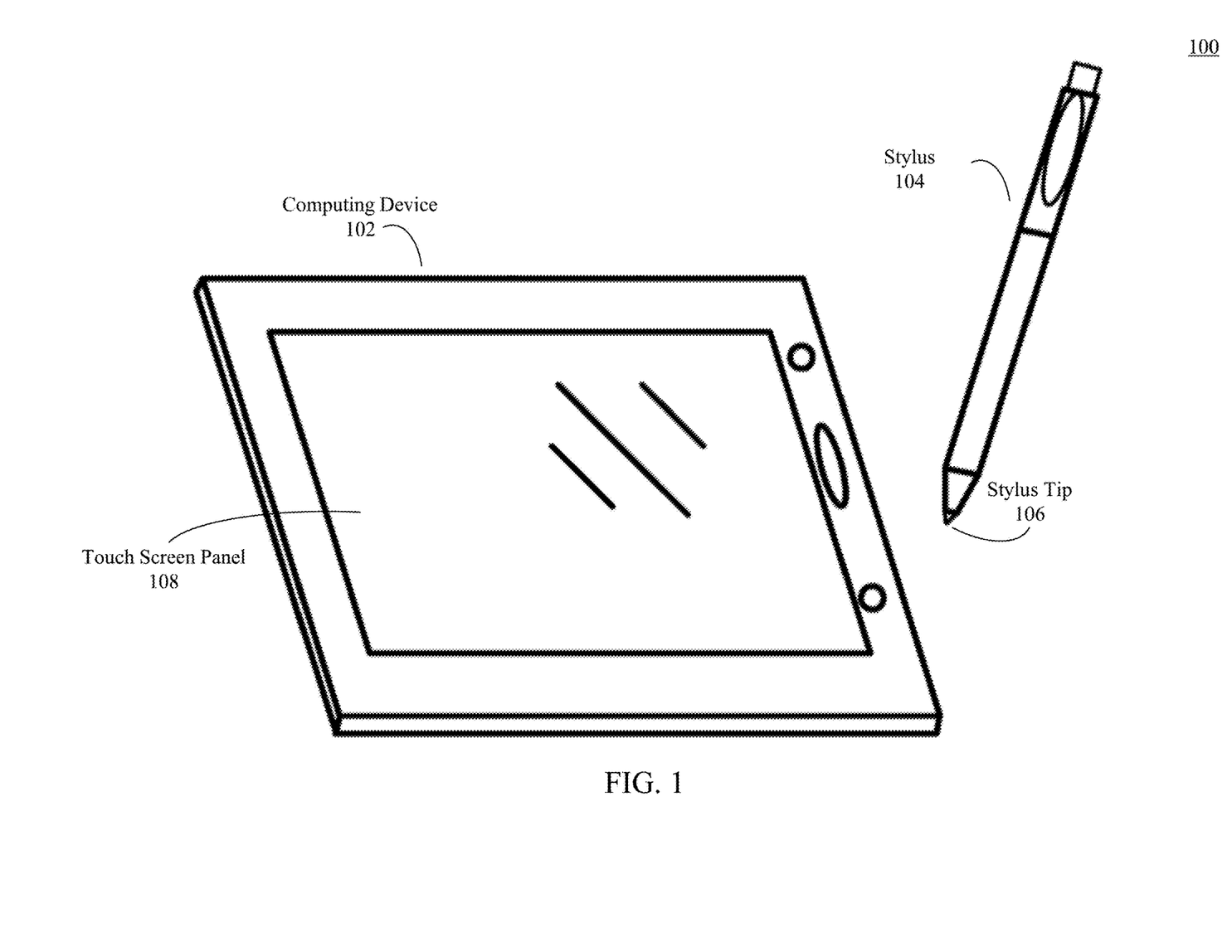
FIG. 1 depicts a touch screen computing device including a touch screen panel, and a stylus suitable for use with the computing device, according to an embodiment.

Accordingly, embodiments of a touch screen panel are described herein that include a friction modified surface that imparts a comparatively rough feel, such as a paper-like feel, when a user contacts the surface with a suitable stylus or digital pen. Touch screen panels can be employed in any type of computing device that requires a display and receiving input from a user. Such devices may include, for example, mobile devices (e.g., smart phones, tablets, PDAs, and the like), notebook and laptop computers and many other kinds of computing devices. Consider, for example, FIG. 1 which depicts a touch screen computing device 102 including a touch screen panel 108, and a stylus 104 suitable for use with computing device 102, according to an embodiment. Stylus 104 includes stylus tip 106, and will be discussed in further detail herein below.

Touch screen panels such as touch screen panel 108 generally include a digitizer (not shown in FIG. 1) for detecting touch input from a finger or digital pen. Digitizers may operate in various ways. For example, digitizers in the touch screen panels of mobile devices such as smart phones and tablets generally operate in a capacitive multi-touch mode using capacitive sensors. One such type of sensor is called a 'mutual capacitive' sensor that is typically formed as a matrix including transparent conductive material (e.g. Indium Tin Oxide [ITO]) arranged in parallel rows and columns, with a capacitor node created where the rows and columns overlap, deposited in layers over the top of the active pixel layers (e.g. LED, OLED or LCD layers) of a touch sensitive display. Other types of touch sensors, however, may be employed in embodiments. For example, so-called "metal mesh" sensors may be formed using copper, colloidal silver or other suitable materials instead of ITO. Likewise, touch sensors may be incorporated directly into the electrode structures of the LCD layer ("in-cell touch panel").

Figure 2:
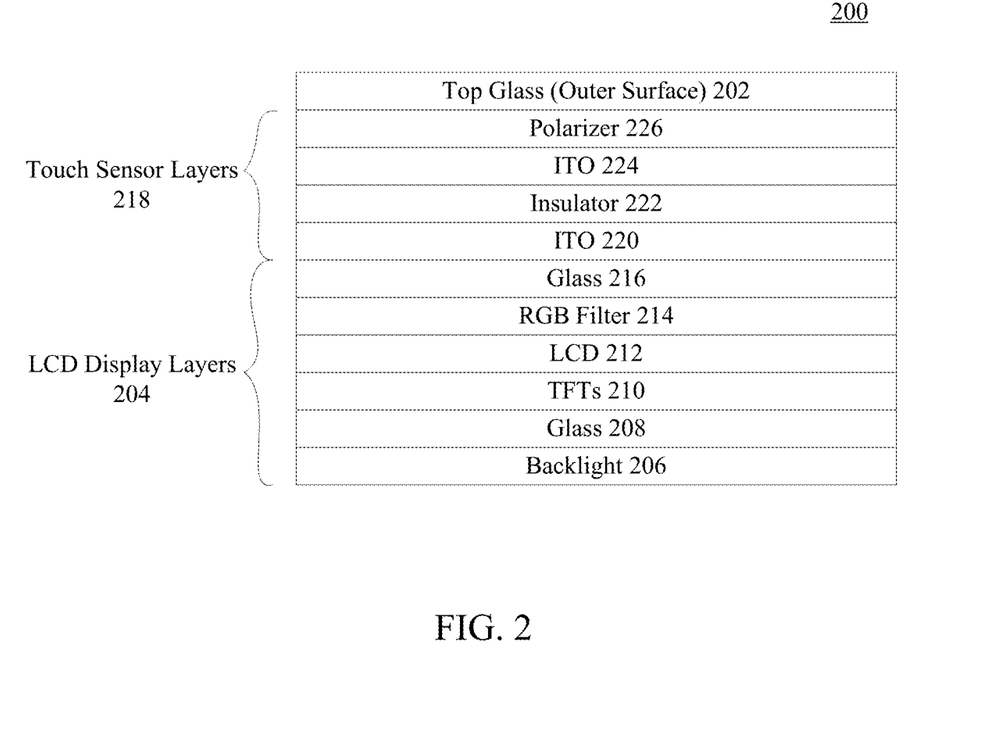
FIG. 2 depicts a schematic side elevation view of a display and touch sensor layers of a touch screen panel, according to an embodiment.

For example, consider FIG. 2 which depicts a schematic side elevation view 200 of LCD display layers 204 and touch sensor layers 218 of a touch screen panel suitable for receiving a friction modified surface, according to an embodiment. LCD display layers 204 include a backlight layer 206, a glass layer 208, a TFT layer 210, an LCD layer 212, an RGB filter layer 214, and a glass layer 216. Touch Sensor Layers 218 include an indium tin oxide ("ITO") layer 220, an insulator layer 222, another ITO layer 224, a polarizer layer 226 and top glass layer 202. These layers of schematic side elevation view 200 are described as follows.

LCD display layers 204 as depicted in schematic view 200 of FIG. 2 are example layers that may be found in conventional liquid crystal thin-film transistor displays. LCD displays are a transmissive medium, whereby light from an always-on light source may be selectively reduced or blocked on a per pixel basis. LCD Display layers 204 include backlight 206 which comprises the always-on white light source. Glass layers 208 and 216 encase the remaining layers. TFTs 210 comprise an array of thin-film transistors arranged as a matrix across the display, with one TFT for each pixel. Each TFT acts as a control valve to drive a liquid crystal cell corresponding to that pixel. When no voltage is applied to the liquid crystal cell, the liquid crystal molecules are aligned parallel to the surface of the display, and thereby block light from being transmitted. Conversely, when a voltage is applied by the TFT, the liquid crystal cell may become wholly or partially transparent. By varying the voltage of applied by each TFT, the intensity of light from backlight 206 may be varied at each discrete location. Since backlight 206 is a white light source, the LCD display also includes RGB filter 214 arranged above LCD layer 212. RGB filter 214 is a matrix of red, green and blue filters that overlay the LCD matrix, and render the light transmitted at each location to be one of those colors. Though not depicted in FIG. 2, LCD Display Layers 204 may also include polarizer layers above and below LCD layer 212.

Touch sensor layers 218 are placed atop LCD display layers 204. As described above, a mutual capacitive sensor may be formed as a matrix including transparent conductive material (e.g. Indium Tin Oxide [ITO]) arranged in parallel rows and columns, with a capacitor node created where the rows and columns overlap. ITO layer 220 and ITO layer 224 each are formed as parallel lines of ITO layered across the entire touch screen surface. Each of the parallel lines in each of ITO layer 220 and ITO layer 224 run perpendicular to the parallel lines of ITO in the other layer. In embodiments, and as described above, in-cell sensors may be used in which case touch sensor layers 218 would not be present.

Touching the surface of the touch screen panel with a finger or other conductive object induces a change in the charge storage capacity, and hence capacitance, of the capacitor nodes (i.e. overlapping layers) in the vicinity of the touch. Each capacitive node is associated with one or more pixels of the display screen that are immediately below the contact point on the screen. The change in capacitance of the capacitor nodes may be detected to determine touch location of the finger or conductive object on the touch sensitive display. The capacitance change may be detected by rapidly sampling each node by any of a variety of techniques as is known in the art. Mutual capacitive detection allows multi-touch operation where multiple touch objects (e.g. fingers) can be tracked at the same time.

Above ITO layer 224, a touch screen panel may include a polarizer layer 226 that operates alone or in conjunction with other anti-reflective layers (not shown) to reduce screen reflection. Polarizer layer 226 serves to polarize light that enters the display from outside the device such that when that polarized light is reflected off of internal layers, polarizer layer 226 blocks that light from leaving the display.

Touch sensor layers 218 also include top glass layer 202 which typically will comprise the outer most layer of the touch screen panel. In a conventional touch screen panel using capacitance touch, projected capacitance touch or some other touch technologies, the outermost surface in which or on which the touch sensitive surface is formed is typically made of a glass, plastic (including polycarbonates, PET, acrylic, etc.) or other similar material. The component having this outermost glass, plastic or other similar material is typically referred to as "cover lens" but sometimes may also be referred to a "top glass" or "top cover". For a cover lens made of glass, such as an ion-strengthened glass, the thickness may range from about 0.3 mm to about 0.6 mm for a smart phone application, and 0.3 mm to 1.0 mm for large displays. For a cover lens made of acrylic material, such as polymethyl methacrylate, the thickness may range from about 1.0 mm and up for a smart phone application.

It should be understood that although embodiments described herein may be couched in terms of capacitive touch sensors and/or TFT LCD displays, embodiments may be implemented using any suitable touch panel technology, including transparent touch technologies such as capacitance touch and projected capacitance touch (including in-cell, sensor on lens, on-cell and other variations), and even some forms of resistive touch technologies. The underlying display can be of any type, including any type of transmissive display such as an LCD, emissive displays such as LED, microLED, and/or OLED, as well as reflective displays based on, for example, electronic paper.

Digitizers that include mutual capacitive sensors may, within certain limits, function to accept touch input with anything capable of inducing a capacitance change in the sensors with perhaps the most familiar example being, a user's finger. Another example includes what is often referred to as a passive stylus. A passive stylus typically includes a relatively large, flexible and blunt tip that is internally electrically connected to the shaft of the stylus that is itself conductive. When held in the hand, the stylus becomes essentially an electrical extension of the hand, acting as an artificial finger that may be used as one would a pen. One problem with this type of stylus is that there are limits to how small you can construct the tip and expect it to function properly with touch sensitive devices. If the tip is too small, it may not be capable of changing sensor node capacitance enough to properly be read out (i.e. input may appear as noise and be filtered out as such). A large, flexible tip may offer all the precision needed for simply navigating menus on the device or webpages. Such a tip is generally not, however, precise enough to use for art drawings or much else. It is also difficult or impossible to see the contact point of the stylus on the touch sensitive leading to further inaccuracy. To address these and other shortcomings of a passive stylus, other types of digital pen have been created.

One type of digital pen operates in a mode generally known as "reflective capacitive." As discussed above, the act of touching a capacitive sensor-based digitizer induces a change in the charge stored in capacitor nodes of the digitizer at the touch point. It is also the case, however, that this action also induces a change in the charge stored at the tip electrode of, for example, a digital pen. A reflective capacitive digital pen operates to detect and measure the induced current or voltage change at the tip electrode, and then amplify that change in response. The result is additional capacitance change at the capacitor nodes due to the amplification, and therefore a much stronger touch signal being detected by the digitizer. Because of the amplification, it is possible to produce a digital pen with a much smaller and rigid tip that may provide the digitizer with higher spatial resolution.

Another type of digital pen operates in a manner similar to a reflective capacitive digital pen, but may include the ability to communicate information directly to the touch sensitive device itself, and may also include specifically engineered tip electrode characteristics designed to work with a matching digitizer design. This type of digital pen is generally known as a "active digital pen." Such active digital pens and their matching digitizers may feature excellent spatial resolution desirable by, for example, graphic designers and artists. Moreover, the ability to establish one-way communication from digital pen to the digitizer, or two-communication between them, permits additional information to be collected by the digitizer, and provided to host applications running on, for example, the counterpart touch sensitive device.

For either type of digital pen (and others), it is possible to employ a smaller and rigid tip, and to control the hardness and friction properties of the tip. When used with such a stylus, embodiments may provide paper-like feedback to the user when drawing or writing on a touch screen panel that includes a friction modified surface. Embodiments provide such paper-like feel on a touch screen panel device by modifying the surface friction of the touch screen to approximate the friction between a piece of paper and the tip of a pen as it moves across the paper. For example, consider FIG. 3 which depicts an example graph 300 of a varying kinetic coefficient of friction ("COF") between a stylus and paper as the stylus moves across the paper. As shown in graph 300, the friction between the pen tip and the paper varies, with an average COF of about 0.30, and moving above or below that value at various points as the pen tip moves 40 mm across the paper. Such changes in the coefficient of friction are generally due to the varying surface roughness of paper itself.

Figure 3:
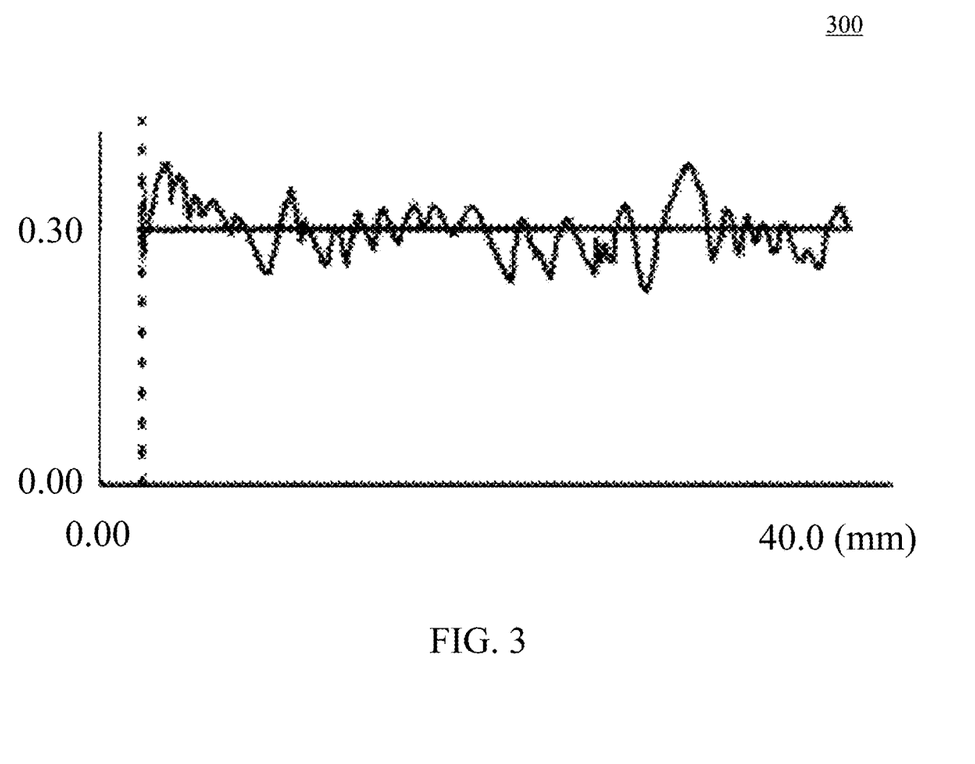
FIG. 3 depicts an example graph of the varying kinetic coefficient of friction between a stylus and paper as the stylus moves across the paper, according to an embodiment.

Note, graph 300 of FIG. 3 is merely exemplary, and serves to illustrate how friction may vary across the surface of real paper, but should not be construed to be a requirement of any embodiment. Embodiments may have an average COF across the surface that is higher or lower than 0.30, depending on characteristics of the chosen friction modifying materials, the properties of the predetermined pattern and/or the properties of the stylus used for touch input, for example. Said another way, embodiments are intended to replicate the variable surface friction of a pen and paper interaction, but not any particular average COF.

Paper has a roughness typically in the range of 1μ to 5μ roughness average (RA) created by the paper's fiber content, where the fiber diameter is 10-50μ and the fiber spacing 10-200μ. Although it may be possible to modify the surface roughness of a touch screen panel to have roughness similar to paper, modifying the surface to add features with a vertical relief between 10-50μ tall would change the clear cover lens surface to be a matte surface, a surface incapable of reproducing full greyscale contrast or the full screen resolution. Moreover, the surface perturbations (e.g., peaks and valleys) would create microscopic "lenslets" that tend to distort displayed images and create, among other problems, color sparkle. Accordingly, embodiments form a friction modified surface on a touch screen panel that approximates the variable friction of paper by interspersing two different friction modifying materials with one another across the surface of the touch screen panel, wherein the materials are chosen to have different friction properties and are deposited as a mono-molecular layer.

Embodiments may employ various different friction modifying materials. For example, modern touch screen panels are sometimes coated with polymer layers that reduce the build up of contaminants or enhance device cleanability (i.e., have a high water contact angle). Such a coating may comprise, for example, a long chain polymer with a siloxane group at one end, and a fluorine group at the other. The siloxane group reacts with hydroxyl groups on the glass surface, thereby creating very strong and stable covalent Si—O bonds. It is observed that the structure of such polymer molecules determines the nano-scale roughness of the surface after coating. In particular, compounds with a long-chain molecular structure that is more glassy/amorphous (e.g., Daikin Optool UD509) will deliver a more lubricative surface compared to compounds with more crystalline short-chain molecule (e.g., Daikin Optool UD120). In embodiments, a 'slippery' amorphous compound interspersed with a higher friction crystalline compound on the surface of a touch screen panel will not only raise the apparent friction of the screen surface with the stylus tip, but also simultaneously be made to vary across the surface. Thus formed, the friction modified surface will cause the stylus tip encounter greater or lesser friction force as the tip moves across each type of material.

Polymer compounds suitable for use in the embodiments disclosed herein possess the following characteristics: for a crystalline material, a kinetic coefficient of friction ("COF") of between 0.06 and 0.10; and, for an amorphous material, a kinetic COF of between 0.01 and 0.05. As understood by one skilled in the art, a kinetic COF is defined as between two materials, and thus is not a property of a particular material. Rather, the kinetic coefficient of friction is an empirical measurement of a "system property" wherein the measured COF depends on the two materials in contact with one another. For the above specified ranges for the kinetic COFs, such COFs are measured between each polymer compound and a paper sample, wherein the paper sample possesses a kinetic COF of approximately 0.17 with another sample of the same paper.

In addition to the above described COFs of compounds suitable for use in embodiments, such compounds may also be chosen with the following additional properties: a water contact angle >90 degrees (for cleanability); and an oil contact angle >30 degrees (for fingerprint resistance) as measured with n-hexadecane. Ideal compounds will also have resistance to skin moisturizer, Vaseline w/6.5% Alpha Hydroxy, perfume, artificial sweat, coffee, coke, ketchup and/or isopropyl alcohol.

Note that unlike prior attempts to produce a touch screen panel with surface friction modification, there is no need to match the bulk indices of refraction of each of the crystalline and amorphous friction modifying compounds since each compound is adhered to the outer surface of the touch screen panel as a mono-molecular layer, in embodiments. In addition to the ability to use friction modifying materials with substantially different indices of refraction, depositing such materials as a mono-molecular layer renders the material pattern invisible, and does not produce any scattering. Moreover, embodiments show virtually no increase in surface haze as compared to an un-patterned surface (i.e., haze measurements of fabricated embodiments using Gardner Hazemeter indicate haze of <0.15%).

Having described compounds suitable for use in embodiments, this written description now turns to how embodiments may control the interspersion of the friction modifying materials with one another across the surface of a touch screen panel. There are of course numerous ways to intersperse two compounds with one another. Embodiments described herein, and as will be discussed in further detail below, use a predetermined pattern for masking portions of the touch screen panel allowing the friction modifying materials to be patterned onto the surface of the panel.

Of course, a number of patterns are possible, but not all patterns are suitable for use. More specifically, suitable patterns should not feature any long term order that may manifest as an unnatural haptic response in the stylus. For example, consider a simple pattern whereby the friction modifying compounds are deposited in a checkerboard pattern across the surface. Although such a surface would feature alternating regions of relatively higher or lower friction, a stylus drawn across such a surface would suffer from objectionable 'clicking' as the stylus tip interacted with the overly regular pattern. Accordingly, embodiments employ pre-determined patterns that feature no long term order such as, for example, Penrose tiling. Penrose tiling will now be described with reference to FIGS. 4a-4c.

Penrose tiling is one type of aperiodic tiling wherein the tiling covers a surface with polygons or other shapes, and the patterns lack translational symmetry (i.e., shifting any tiling by a finite distance without rotation cannot produce the same tiling). Although Penrose tiling may have both reflection and rotational symmetry, it is the lack of translational symmetry that makes Penrose tiling suitable for use in embodiments. This is true because moving the stylus in a straight line across a Penrose tiled surface cannot result in the stylus tracing out a repeating pattern.

Figure 4A:
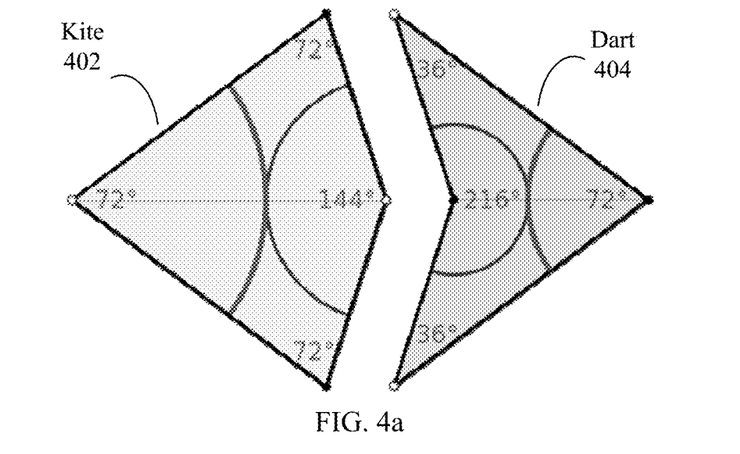
FIG. 4a depicts Penrose tile 'dart' and 'kite' primitives, according to an embodiment.
Figure 4B:
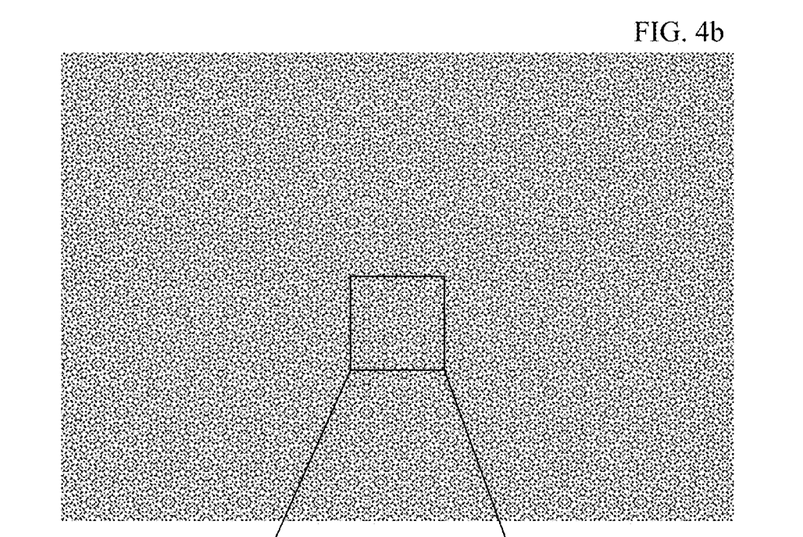
FIG. 4b depicts a Penrose pattern generated from the kites and darts of FIG. 4a, according to an embodiment.
Figure 4C:
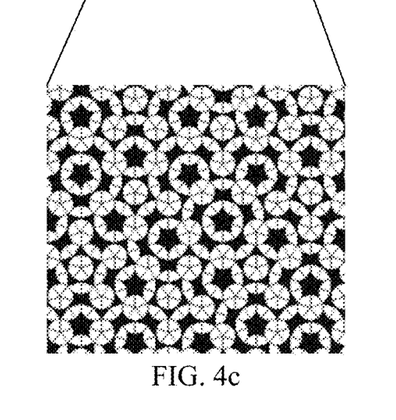
FIG. 4c depicts a zoomed view of the Penrose pattern of FIG. 4b, according to an embodiment.

Penrose tilings have a number of variations that use different tile shapes. FIG. 4a depicts Penrose tile 'dart' and 'kite' primitives, according to an embodiment. FIG. 4a includes a kite 402 and a dart 404. Instances of kite and darts may be tiled according to certain matching rules, with such tiling able to be expanding outward indefinitely. For example, FIG. 4b shows a Penrose pattern generated from kites 402 and darts 404 of FIG. 4a, according to an embodiment. Since it is difficult to discern the structure of the Penrose tiling of FIG. 4b, FIG. 4c depicts a zoomed view of the Penrose pattern of FIG. 4b that shows the detail. Alternatives to Penrose tiling are suitable for use with embodiments.

Figure 5A:
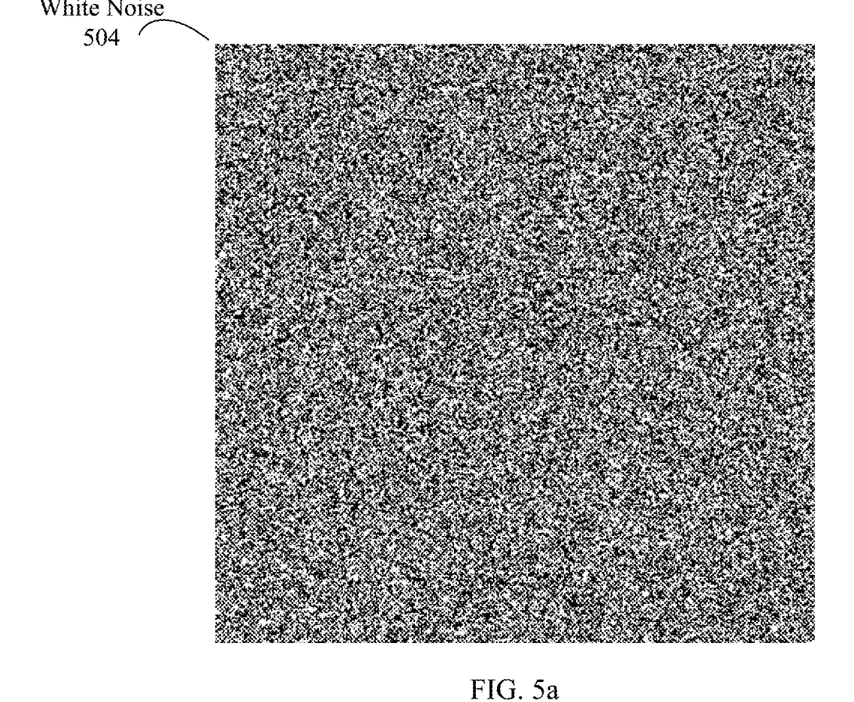
FIGS. 5a and 5b depict a white noise pattern and a graph of a typical white noise radial power spectrum, respectively, according to an embodiment.
Figure 5B:
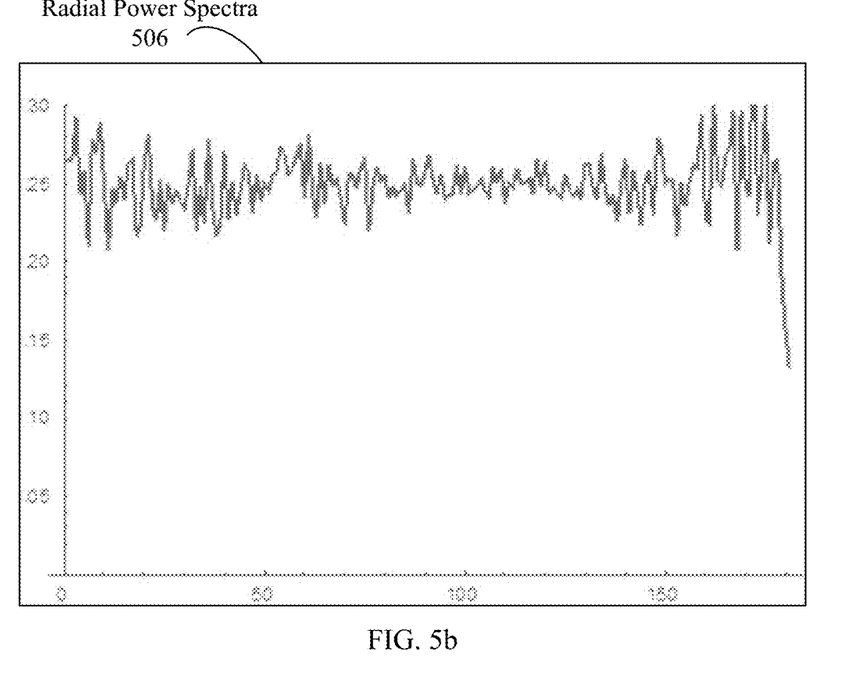

For example, FIGS. 5a and 5b depict a white noise pattern 504 and a graph 506 of a typical white noise radial power spectrum, respectively, according to an embodiment. The pixels of a white noise image are each independent random variables with a uniform probability distribution. Such a white noise image may be created by generating a random number between 0 and 255 for each pixel, with the resulting number corresponding to an 8-bit shade of grey for that pixel. White noise pattern 504 may be created from such a white noise image by applying a thresholding operation to render the pixels as either black or white. White noise pattern 504 may then be used to pattern the deposition of the two friction modifying materials, wherein each material corresponds to either a black or white pixel of white noise pattern 504.

Graph 506 of FIG. 5b illustrates a typical white noise radial power spectrum. Consistent with the fact the pixels of a white noise image are random variables with a uniform distribution, power is spread substantially evenly across the frequency spectrum. The presence of power in the lower frequencies corresponds to larger, 'blockier' areas of the pattern (i.e., aggregates), and such areas may result in unnatural variations in surface friction as felt by the stylus. In such instances, embodiments may instead employ an alternative pattern with little or no low frequency energy.

Figures 6A, 6B:
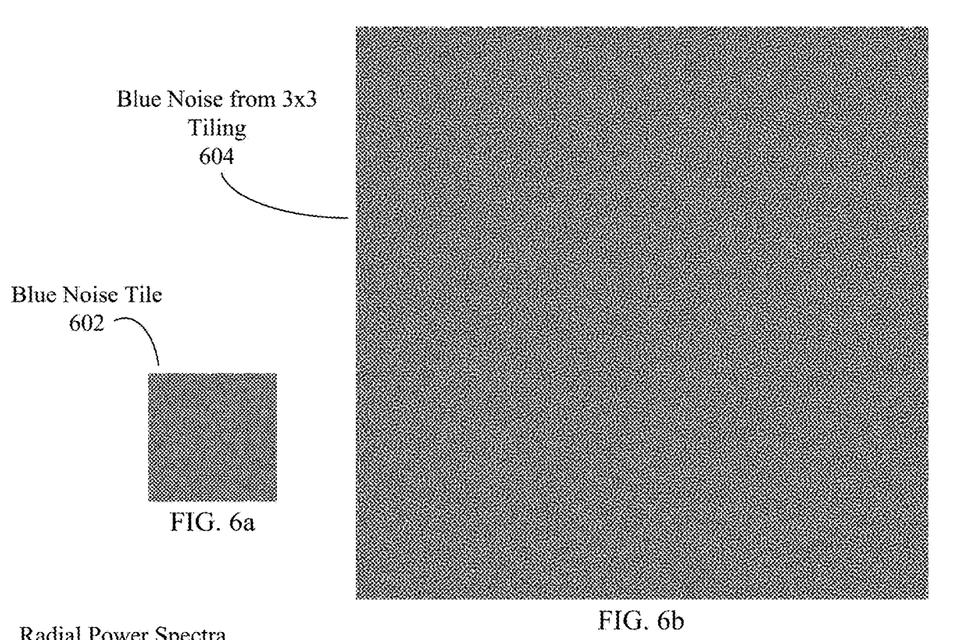
FIG. 6a depicts a blue noise tile pattern, according to an embodiment.
FIG. 6b depicts a blue noise pattern generated as a 3×3 matrix of the blue noise tile pattern of FIG. 6a, according to an embodiment.
Figure 6C:
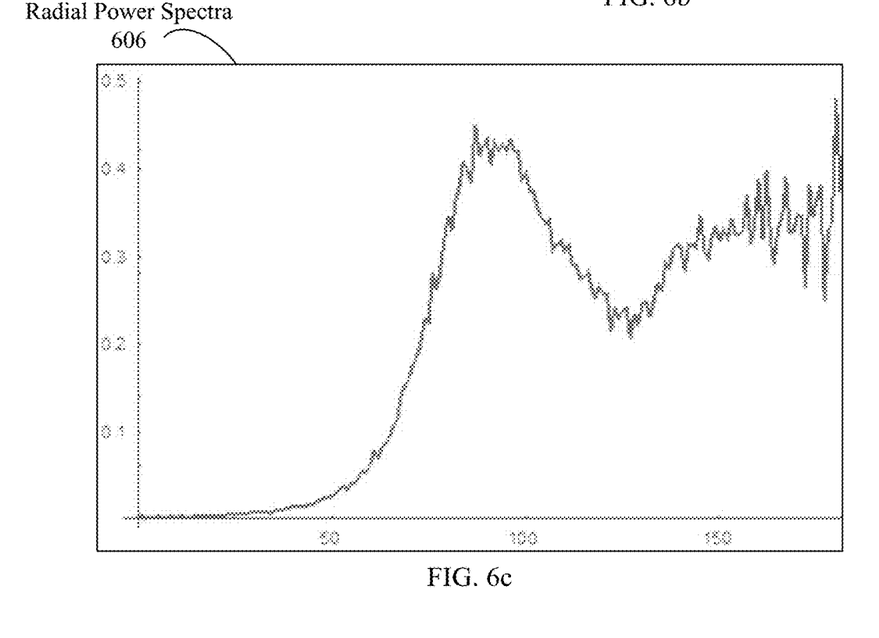
FIG. 6c depicts a graph of typical radial power spectrum for a blue noise pattern, according to an embodiment.

For example, FIGS. 6a-6c depict a blue noise tile 602, a blue noise pattern 604 that comprises a 3×3 tiling of blue noise tile 602, and a typical blue noise radial power spectrum 606, according to embodiments. Blue noise prevents aggregates from forming in a pattern, and a blue noise pattern such as blue noise pattern 604 may be desirable for use in embodiments. The lack of aggregates is due in part to the lack of low frequency components as illustrated by the blue noise radial power spectrum 606.

Blue noise pattern 604 may be generated in a number of ways as known in the art. For example, combining a 50% grey base image with a small amount of white noise, and running the resulting image through an error diffusion algorithm (e.g., Jarvis Judice and Ninke) may generate an image substantially comprising blue noise. Various alternatives for generating a blue noise image are known in the art, but may in some cases be computationally intensive. Accordingly, it may be desirable to use a pre-computed blue noise tile such as, for example, blue noise tile 602, and build up larger blue noise images by forming a matrix of N×N blue noise tiles 602. For example, blue noise pattern 604 is a 3×3 matrix of blue noise tile 602. Despite the repeated use of blue noise tile 602, it can be seen that blue noise pattern 604 has little to no discernable repeating pattern.

Accordingly, embodiments need not be patterned with a single monolithic pattern over the entire touch screen panel surface. Instead, tiling may be employed so long as care is taken so that repeating structures do not arise and become apparent when used with a stylus. That is, the transition points between one tile and another should not be so abrupt as to be detectable to the user when such transitions are traversed by the stylus tip. Likewise, it is not necessary for tiling to use only a single blue noise tile pattern such as blue noise tile 602. Instead, any number of tiles may be used in conjunction with one another to build up a blue noise pattern analogous to blue noise pattern 604 (or other noise pattern such as a white noise pattern).

Figure 7:
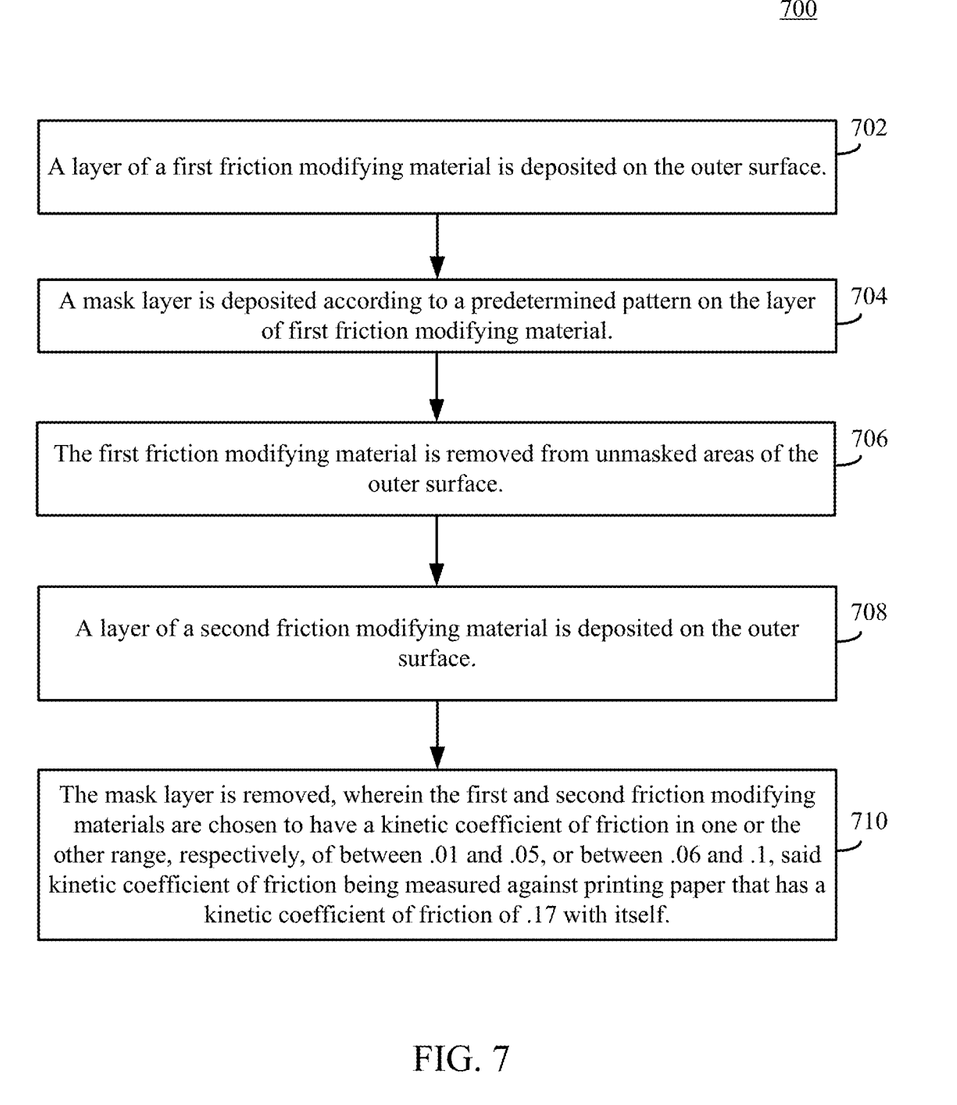
FIG. 7 depicts a flowchart of an example method for fabricating a friction modified touch screen panel, according to an embodiment.

Having described suitable compounds and mask patterns herein above, the written description now turns to the description of a method for fabricating a friction modified touch screen panel. For example, FIG. 7 depicts a flowchart 700 of an example method for fabricating a friction modified touch screen panel, according to an embodiment. FIGS. 8a-8e depict schematic side elevation views of layer-by-layer fabrication steps of a surface friction modification of a touch screen panel, wherein each step corresponds to a step of flowchart 700 of FIG. 7. Accordingly, flowchart 700 of FIG. 7 will be described with reference to FIGS. 8a-8e.

Flowchart 700 of FIG. 7 beings at step 702. At step 702, a layer of a first friction modifying material is deposited on the outer surface. For example, and with reference to FIG. 8a, a uniform layer 802a of a first friction modifying material is deposited on, for example, the entirety of top glass 202 (i.e., outer surface) of touch screen panel 108 of computing device 102. The first friction modifying material may comprise, as described above, a relatively amorphous compound, or a relatively more crystalline compound.

Flowchart 700 continues with step 704. At step 704, a mask layer is deposited according to a predetermined pattern on the layer of first friction modifying material. For example, and with reference to FIG. 8b, a mask layer 804 is deposited atop the first friction modifying material of layer 802a, and serves to protect portions of layer 802a from subsequent processing steps (i.e., in manner analogous to integrated circuit fabrication).

Figure 8A:
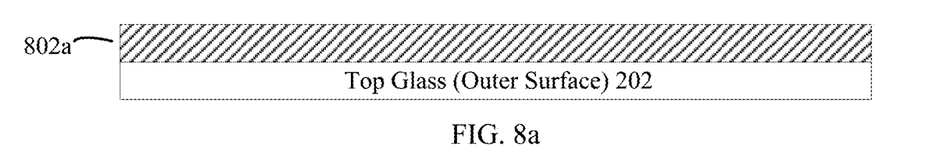
FIGS. 8a-8e depict schematic side elevation views of layer-by-layer fabrication steps of a surface friction modification of a touch screen panel, according to an embodiment.
Figure 8B:
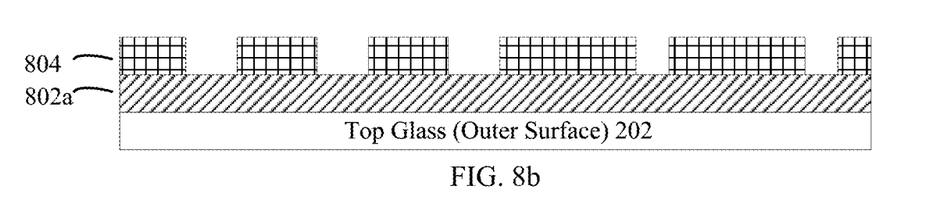
Figure 8C:
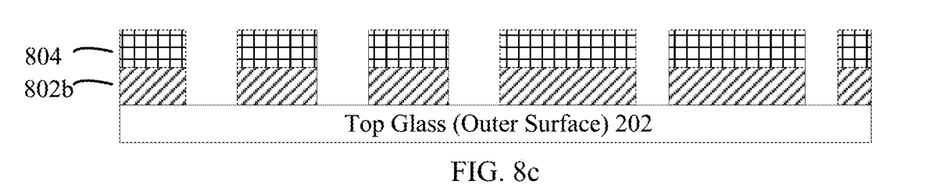

Flowchart 700 continues with step 706. At step 706, the first friction modifying material is removed from unmasked areas of the outer surface. With reference to FIGS. 8b and 8c, the portions of layer 802a of FIG. 8b visible from above through the windows in the mask may be removed by, for example, plasma etching to yield etched layer 802b as shown in FIG. 8c. After etching, the windows in mask layer 804 extend down and through the first friction modifying material of layer 802a all the way to the top glass layer 202.

Figure 8D:
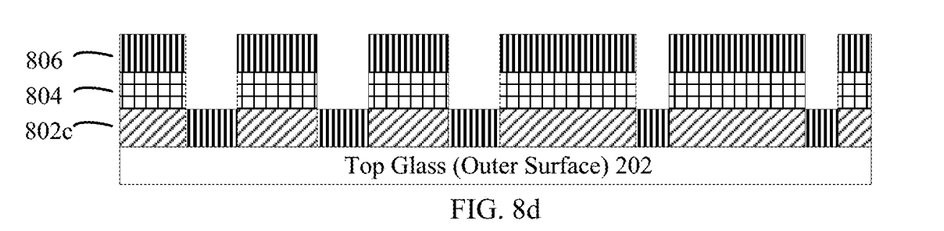
Figure 8E:
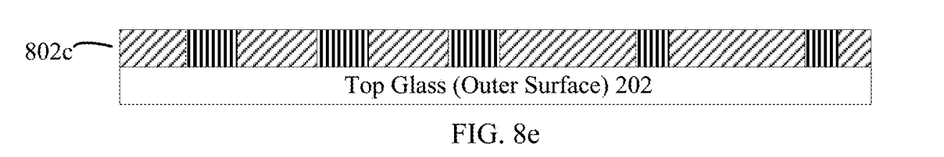

Flowchart 700 continues with step 708. At step 708, a layer of a second friction modifying material is deposited on the outer surface. With reference to FIG. 8d, layer 806 comprises the second friction modifying material, wherein the material has the complementary friction profile of the first friction modifying material initially deposited as layer 802a as shown in FIG. 8a and as described above in conjunction with step 702 of flowchart 700. That is, if the initial layer 802a was deposited with the more amorphous compound, then layer 806 is deposited using the more crystalline compound, and vice-versa. During deposition of layer 806, second friction modifying material extends down through the window in mask layer 804 and etched layer 802b to come in contact with, and bond to, top glass layer 202. After deposition of layer 806, the bottommost layer in the stack, layer 802c, comprises the patterned combination of first and second friction modifying materials.

Flowchart 700 concludes with step 710. At step 710, the mask layer is removed. For example, and with reference to FIGS. 8d and 8e, mask layer 804 and any remaining amount of the second friction modifying material that remains above layer 802c (i.e. at layer 806) are removed which yields a top glass layer 202 on which first and second friction modifying materials are interspersed according to the predetermined mask pattern employed. As discussed above, first and second friction modifying materials are chosen such that each is one or the other range of acceptable kinetic COFs as measured against paper that has a kinetic COF of approximately 0.17 when measured against itself. Note, the fabrication process of flowchart 700 of FIG. 7, and as illustrated by FIGS. 8a-8e, is but a single example of a process for fabricating a touch screen panel with surface friction modification, and other process steps and techniques may be substituted in embodiments.

In an embodiment, the aforementioned first and second friction modifying materials are chosen to have a kinetic coefficient of friction in one or the other range, respectively, of between 0.01 and 0.05, or between 0.06 and 0.1, said kinetic coefficient of friction being measured against printing paper that has a kinetic coefficient of friction of 0.17 with itself.

For example, one such process may comprise a lift-off screen printing process. Such a process may proceed by first patterning the top glass (e.g., such as top glass 202 as depicted in FIG. 2) with a glue according to the predetermined pattern as described above. Next, a layer of first friction modifying material may be put down atop the glue layer, wherein the glue layer serves as a mask. The voids in the glue layer permit the first friction modifying layer to make contact with the glass surface and bond thereto at those sites. Next, the glue may be dissolved with a solvent, and any excess friction modifying material may be mechanically removed leaving behind only strongly bonded material. At that point, you are left with a top glass with first friction modifying material patterned thereon according to the predetermined pattern, and voids in the first friction modifying material extend down to the glass surface. Next, second friction modifying material may be deposited, wherein the second friction modifying material may penetrate through the voids in the second friction modifying material all the way down to the glass top, and thereby bond thereto. Last, the excess and loosely bonded second friction modifying material may be removed, thereby exposing the first friction modifying material, and leaving the first and second friction modifying materials interspersed across the surface of the touch screen panel.

In yet another embodiment, dry film photolithography may be used to fabricate a touch screen with surface friction modification. Such process steps may proceed in the following general manner:

- Laminate top glass with dry film photoresist (e.g., DuPont Riston EM213)
- Overlay laminated top glass with a photomask of the predetermined pattern, and expose unmasked photoresist to UV light.
- Remove unexposed photoresist by developing with 1.0 wt % Sodium Carbonate at room temperature. Top glass is now patterned with a polymerized photoresist mask including voids down to the top glass.
- Spray coat a layer of the $1^{st}$ friction modifying material such that the material can penetrate down to the exposed top glass and bond thereto.
- Dissolve the UV exposed/polymerized photoresist with, for example, 1.5 wt % Sodium Hydroxide and remove excess and loosely bonded $1^{st}$ friction modifying material. Top glass is now patterned with the $1^{st}$ friction modifying material including voids down to the top glass.
- Spray coat the $2^{nd}$ friction modifying material such that the material can penetrate down to the exposed top and bond thereto.
- Remove excess and loosely bonded $2^{nd}$ friction modifying material, thereby leaving $1^{st}$ and $2^{nd}$ friction modifying materials interspersed with one another across the surface of the touch screen panel.

III. Additional Example Embodiments

A touch screen panel including a friction modified touch sensitive surface is provided herein. The friction modified touch sensitive surface comprises: an outer surface of the touch screen panel, the outer surface including a touch sensitive area; a first friction modifying material; and a second friction modifying material, wherein the first and second friction modifying materials are interspersed with one another according to a predetermined pattern as a mono-molecular layer on the outer surface, and wherein the first friction modifying material is relatively more amorphous than the second friction modifying material.

In an embodiment of the foregoing touch screen panel, a difference in refractive indexes of the first and second friction modifying materials is greater than 0.10.

In another embodiment of the foregoing touch screen panel, the first friction modifying material has a kinetic coefficient of friction of between 0.01 and 0.05, the second friction modifying material has a kinetic coefficient of friction between 0.06 and 0.10, wherein the kinetic coefficients of friction of the first and second friction modifying materials are measured against printing paper that has a kinetic coefficient of friction of 0.17 with itself.

In one embodiment of the foregoing touch screen panel, the first and second friction modifying materials have a water contact angle of greater than 90 degrees.

In an embodiment of the foregoing touch screen panel, the first and second friction modifying materials have an oil contact angle of greater than 60 degrees as measured with n-hexadecane.

In another embodiment of the foregoing touch screen panel, the predetermined pattern comprises: a Penrose tiling pattern; a white noise pattern; a blue noise pattern; or a plurality of sub-patterns, each sub-pattern being adjacent to at least one other sub-pattern wherein transitions between adjacent sub-patterns are substantially undetectable.

In another embodiment of the foregoing touch screen panel, the predetermined pattern has a feature size greater than 200 microns.

A method of forming a friction modified touch sensitive surface on an outer surface of a touch screen panel is provided herein. The method comprises: depositing a layer of a first friction modifying material on the outer surface; depositing a mask layer according to a predetermined pattern on the layer of first friction modifying material; removing the first friction modifying material from unmasked areas of the outer surface; depositing a layer of a second friction modifying material on the outer surface; and removing the mask layer, wherein the first and second friction modifying materials are chosen to have a kinetic coefficient of friction in one or the other range, respectively, of between 0.01 and 0.05, or between 0.06 and 0.1, said kinetic coefficient of friction being measured against printing paper that has a kinetic coefficient of friction of 0.17 with itself.

In one embodiment of the foregoing method, the first friction modifying material is relatively more amorphous than the second friction modifying material.

In another embodiment of the foregoing method, a difference in refractive indexes of the first and second friction modifying materials is greater than 0.1.

In an embodiment of the foregoing method, the first and second friction modifying materials have a water contact angle of greater than 90 degrees.

In one embodiment of the foregoing method, the first and second friction modifying materials have an oil contact angle of greater than 30 degrees as measured with n-hexadecane.

In another embodiment of the foregoing method, the predetermined pattern comprises: a Penrose tiling pattern; a white noise pattern; a blue noise pattern; or a plurality of sub-patterns, each sub-pattern being adjacent to at least one other sub-pattern wherein transitions between adjacent sub-patterns are substantially undetectable.

In another embodiment of the foregoing method, the layers of first and second friction modifying materials are deposited as mono-molecular layers.

A touch screen computing device is provided herein. The touch screen computing device comprises: a processor; a touch screen panel coupled to the processor and including a friction enhanced touch sensitive surface comprising: an outer surface of the touch screen panel, the outer surface including a touch sensitive area; a first friction modifying material; and a second friction modifying material, wherein the first and second friction modifying materials are interspersed with one another according to a predetermined pattern as a mono-molecular layer on the outer surface, and wherein the first friction modifying material is relatively more amorphous than the second friction modifying material.

In an embodiment of the foregoing touch screen computing device, a difference in refractive indexes of the first and second friction modifying materials is greater than 0.10.

In another embodiment of the foregoing touch screen computing device, the first friction modifying material has a kinetic coefficient of friction of between 0.01 and 0.05, the second friction modifying material has a kinetic coefficient of friction between 0.06 and 0.10, wherein the kinetic coefficients of friction of the first and second friction modifying materials are measured against printing paper that has a kinetic coefficient of friction of 0.17 with itself.

In one embodiment of the foregoing touch screen computing device, the first and second friction modifying materials have a water contact angle of greater than 90 degrees.

In an embodiment of the foregoing touch screen computing device, the first and second friction modifying materials have an oil contact angle of greater than 30 degrees as measured with n-hexadecane.

In another embodiment of the foregoing touch screen computing device, the predetermined pattern comprises: a Penrose tiling pattern, a white noise pattern, a blue noise pattern, or a plurality of sub-patterns, each sub-pattern being adjacent to at least one other sub-pattern wherein transitions between adjacent sub-patterns are substantially undetectable.

IV. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A touch screen panel including a friction modified touch sensitive surface, the friction modified touch sensitive surface comprising:
   an outer surface of the touch screen panel, the outer surface including a touch sensitive area;
   a first friction modifying material; and
   a second friction modifying material, wherein the first and second friction modifying materials are interspersed with one another according to a predetermined pattern as a mono-molecular layer on the outer surface, and wherein the first friction modifying material is relatively more amorphous than the second friction modifying material.

2. The touch screen panel of claim 1, wherein a difference in refractive indexes of the first and second friction modifying materials is greater than 0.10.

3. The touch screen panel of claim 2, wherein the first friction modifying material has a kinetic coefficient of friction of between 0.01 and 0.05, the second friction modifying material has a kinetic coefficient of friction between 0.06 and 0.10, wherein the kinetic coefficients of friction of the first and second friction modifying materials are measured against printing paper that has a kinetic coefficient of friction of 0.17 with itself.

4. The touch screen panel of claim 1, wherein the first and second friction modifying materials have a water contact angle of greater than 90 degrees.

5. The touch screen panel of claim 1, wherein the first and second friction modifying materials have an oil contact angle of greater than 30 degrees as measured with n-hexadecane.

6. The touch screen panel of claim 1, wherein the predetermined pattern comprises: a Penrose tiling pattern;
   a white noise pattern;
   a blue noise pattern; or a plurality of sub-patterns, each sub-pattern being adjacent to at least one other sub-pattern wherein transitions between adjacent sub-patterns are substantially undetectable.

7. The touch screen panel of claim 6, wherein the predetermined pattern has a feature size greater than 200 microns.

8. A method of forming a friction modified touch sensitive surface on an outer surface of a touch screen panel, comprising:
   depositing a layer of a first friction modifying material on the outer surface;
   depositing a mask layer according to a predetermined pattern on the layer of first friction modifying material;
   removing the first friction modifying material from unmasked areas of the outer surface;
   depositing a layer of a second friction modifying material on the outer surface; and
   removing the mask layer;
   wherein the first and second friction modifying materials are chosen to have a kinetic coefficient of friction in one or the other range, respectively, of between 0.01 and 0.05, or between 0.06 and 0.1, said kinetic coefficient of friction being measured against printing paper that has a kinetic coefficient of friction of 0.17 with itself.

9. The method of claim 8, wherein the first friction modifying material is relatively more amorphous than the second friction modifying material.

10. The method of claim 8, wherein a difference in refractive indexes of the first and second friction modifying materials is greater than 0.1.

11. The method of claim 8, wherein the first and second friction modifying materials have a water contact angle of greater than 90 degrees.

12. The method of claim 8, wherein the first and second friction modifying materials have an oil contact angle of greater than 30 degrees as measured with n-hexadecane.

13. The method of claim 8, wherein the predetermined pattern comprises: a penrose tiling pattern;
   a white noise pattern;
   a blue noise pattern; or a plurality of sub-patterns, each sub-pattern being adjacent to at least one other sub-pattern wherein transitions between adjacent sub-patterns are substantially undetectable.

14. The method of claim 8, wherein the layers of the first and second friction modifying materials are deposited as mono-molecular layers.

15. A touch screen computing device, comprising:
a processor;
a touch screen panel coupled to the processor and including a friction enhanced touch sensitive surface comprising:
an outer surface of the touch screen panel, the outer surface including a touch sensitive area;
a first friction modifying material; and
a second friction modifying material, wherein the first and second friction modifying materials are interspersed with one another according to a predetermined pattern as a mono-molecular layer on the outer surface, and wherein the first friction modifying material is relatively more amorphous than the second friction modifying material.

16. The touch screen computing device claim 15, wherein a difference in refractive indexes of the first and second friction modifying materials is greater than 0.1.

17. The touch screen computing device of claim 16, wherein the first friction modifying material has a kinetic coefficient of friction of between 0.01 and 0.05, the second friction modifying material has a kinetic coefficient of friction between 0.06 and 0.1, wherein the kinetic coefficients of friction of the first and second friction modifying materials are measured against printing paper that has a kinetic coefficient of friction of 0.17 with itself.

18. The touch screen computing device of claim 15, wherein the first and second friction modifying materials have a water contact angle of greater than 90 degrees.

19. The touch screen computing device of claim 15, wherein the first and second friction modifying materials have an oil contact angle of greater than 30 degrees as measured with n-hexadecane.

20. The touch screen computing device of claim 15, wherein the predetermined pattern comprises: a Penrose tiling pattern;
a white noise pattern;
a blue noise pattern;
or a plurality of sub-patterns, each sub-pattern being adjacent to at least one other sub-pattern wherein transitions between adjacent sub-patterns are substantially undetectable.

* * * * *